United States Patent Office 2,922,880
Patented Jan. 26, 1960

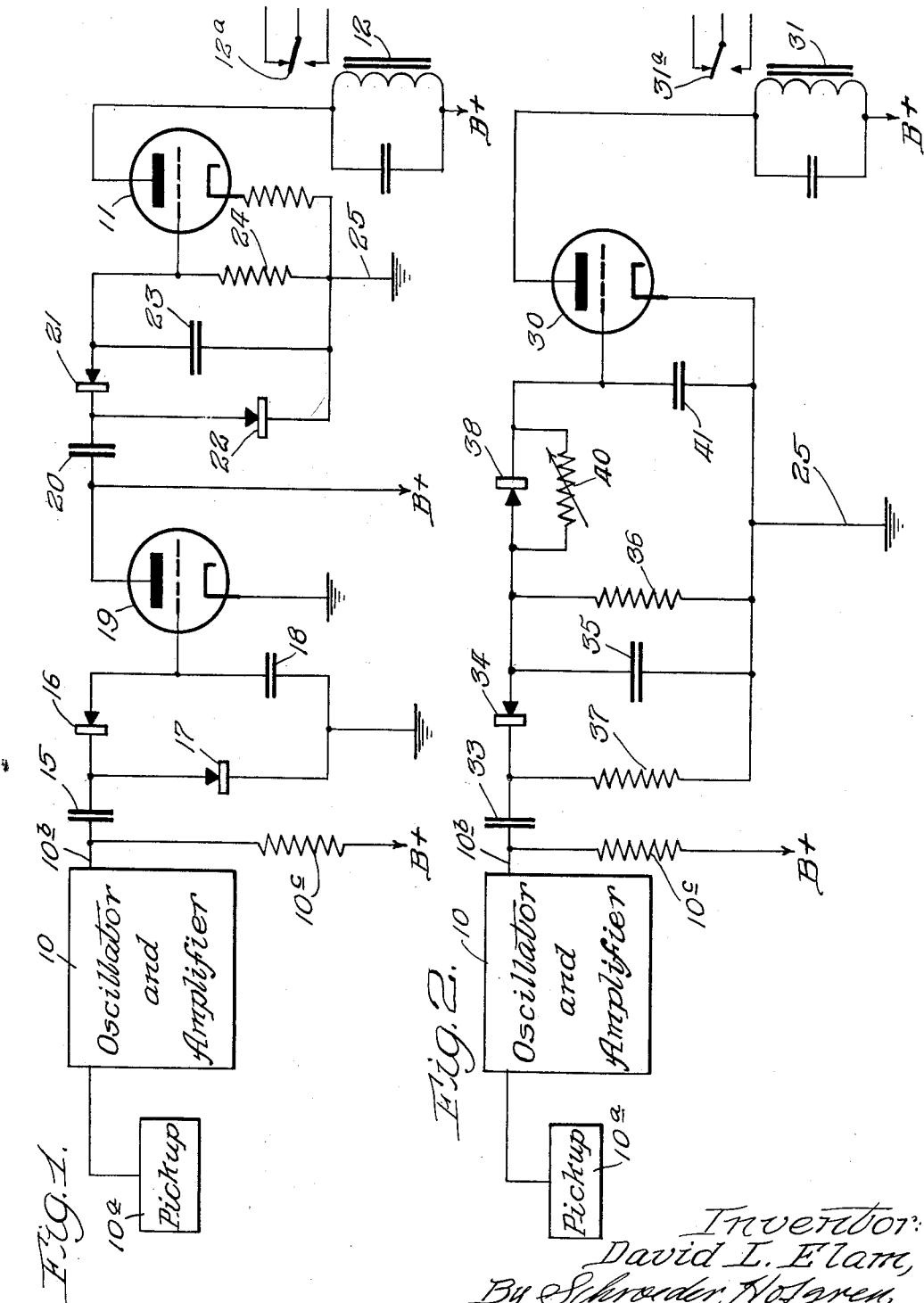

2,922,880
ELECTRICAL SENSING APPARATUS

David L. Elam, Roselle, Ill., assignor to Electro Products Laboratories, Inc., a corporation of Illinois Application March 11, 1958, Serial No. 720,642

3 Claims. (Cl. 250—27)

This invention is concerned with an electrical sensing system and more particularly with an electrical sensing system incorporating a novel indicating circuit.

An electrical sensing apparatus which is responsive to the presence of conductive material within a predetermined area adjacent a pickup is disclosed and claimed in copending Elam application, Serial No. 481,146, filed January 11, 1955, now Patent No. 2,883,538. In the apparatus disclosed in this application, an oscillator is connected with the pickup, which includes a coil forming a portion of the tuned circuit of the oscillator, the circuit sustaining oscillation in the absence of a conductor in the field of the pickup, but being damped with a conductor present. A circuit connected with the oscillator indicates the presence or absence of the oscillations in the oscillator.

It is an object of the present invention to provide a system which gives an indication in response to a predetermined periodic shift in condition of the sensing device.

Another object is the provision of a system in which the indication is sustained for a period of time greater than the period during which the conductive object is in the field of the pickup, which may be a fraction of a millisecond.

One feature of the invention is the provision of a system including sensing means having a first condition and a second condition and responsive to a predetermined actuation for shifting from one of the conditions to the other, indicating means responsive to the sensing means and having a first condition and a second condition, and bias means maintaining the indicating means in one of the conditions for a period differing from the corresponding period of the sensing means, to provide a desired type of indication. More particularly, where the sensing means is an oscillator having an oscillatory and a nonoscillatory condition, it is a feature of the invention that it provides a system which is responsive to a shift of the condition of the sensing means between oscillation and nonoscillation.

A further feature is that the bias means maintain the indicating means in the other of the conditions thereof when the sensing means remains continuously in either of its conditions.

Another feature is that circuit means are provided to derive a signal from the sensing means as a result of the shift in condition thereof which signal is utilized to provide a bias potential for the indicating means. Yet a further feature is that the bias circuit has an appreciable time constant.

Further features and advantages will readily be apparent from the following specification and from the drawings, in which:

Figure 1 is a schematic circuit diagram, partially in block form, of one embodiment of the invention; and Figure 2 is a schematic circuit diagram, partially in block form, of another embodiment of the invention.

The circuit and apparatus disclosed in the aforementioned Elam application are satisfactory for sensing the presence of a conductive object in the sensitive area of the pickup and have been used as a metal detector, limit switch, counter and the like. The present invention, with an indicating circuit which is responsive to a periodic shift of the sensing means from one condition to another, permits the incorporation of the sensing apparatus in more sophisticated automatic control systems.

Turning now to Figure 1 of the drawing, an embodiment of the invention is illustrated. An oscillator-amplifier unit illustrated in block form at 10 has connected thereto a pickup 10a, all of which may be of the type disclosed in the aforementioned application. The oscillator-pickup are so designed that the oscillator operates when there is no conductive material in the field of the pickup 10a, but the oscillations are quenched when conductive material is in the field. The amplified oscillations appear at output terminal 10b of oscillator-amplifier unit 10 across resistor 10c in the output circuit of the amplifier. The signals derived from the oscillator-amplifier unit are utilized, as will appear in more detail later, to provide bias control signals for an output circuit including an output tube 11, which has a relay 12 connected in the anode circuit thereof. Switch contacts 12a associated with relay 12 may be connected as desired in suitable indicator circuits, to provide signals, such as lighting a light, sounding a buzzer or the like, in accordance with the condition being sensed. The terms conductive and nonconductive as used herein in connection with the output tube are intended and should be understood to mean sufficiently and insufficiently conductive to energize the relay in the plate circuit of the tube. It will be appreciated that a relatively low amplitude of current through the tube may be insufficient to actuate the relay.

The circuit of Figure 1 is designed to maintain the indicating device, here relay 12, in an unenergized condition so long as the oscillator periodically shifts from a condition of oscillation to no oscillation, at a predetermined rate. An example of an application for this system is in determining when a moving member, as a shaft, drops below a predetermined speed. The shaft may have mounted on it a toothed wheel with the pickup 10a located near it so that oscillations are damped each time a tooth passes the pickup. So long as the shaft turns at greater than the predetermined speed, relay 12 is unenergized, but should the speed drop below this, or the shaft stop completely, the relay is energized, giving a desired indication through a circuit (not shown) connected with the contacts 12a thereof.

The circuit and its operation will now be described in detail, and specific values and type designations assigned to the various elements. It is to be understood that these values and designations are given solely for the purpose of disclosing an operative circuit, and many modifications will be apparent to those skilled in the art.

The amplified oscillations appearing at the amplifier output terminal 10b are coupled through a capacitor 15, 0.001 μf (microfarad), to a voltage doubler circuit including two diodes 16 and 17, each a 1N34A. So long as the oscillator is operating, i.e. when there is no conductive material in the field of pickup 10a, the oscillations are rectified by the voltage doubler circuit and a negative potential is built up across capacitor 18, 0.002 μf, connected between the control grid of a triode 19, one-half of a 6SN7, and ground 25. This negative potential on the grid keeps the triode 19 near or below cut-off, so that the potential on the plate thereof is relatively high. When oscillations cease, as by entry of a conductive object in the field of the pickup, triode 19 conducts and plate voltage thereof drops, the resulting negative pulse being coupled through capacitor 20, 0.1 μf, to a second voltage doubler rectifier arrangement including two diodes 21, a 1N461 and 22, 1N34A. The output of this doubler is coupled to a load made up of a parallel combination of capacitor 23 and resistor 24 connected between the control grid of output tube 11, one-half of a 6SN7, and ground 25. The negative pulse resulting from conduction of tube 19 charges capacitor 23 applying substantial negative potential to the control grid of output tube 11. This potential, while not necessarily sufficient to cut off all conduction by tube 11 is sufficient to keep the anode current below that necessary for energizing relay 12. Immediately following the negative pulse, the charge on capacitor 23 begins to drain off through resistor 24, connected in parallel therewith. Unless another negative pulse renews the charge on capacitor 23 periodically, the voltage on the control grid of tube 11 rises to a point sufficient to permit energization of relay 12.

The permissible time between pulses is a function of the RC time constant of capacitor 23 and resistor 24 in parallel with the back resistance of diodes 21 and 22 and is in excess of one RC in most cases and may be as much as three RC depending on the amplitude of the pulses at the plate of tube 19. For example, for a timing between pulses of one second, the product of R and C should be 0.33. Such a circuit could have a 3.3 µf capacitor and a 100,000 ohm resistor, or another combination with the same time constant. Resistor 24 may be made variable to facilitate adjustment of the response time of the circuit.

Should the movement being sensed stop completely, relay 12 is energized regardless of the condition of the sensing circuit, i.e. whether the oscillator is operative or inoperative. If the oscillator operates continuously, tube 19 is cut off but tube 11 conducts, and relay 12 is energized. If the oscillator is inoperative, tube 19 conducts continuously, but there are no periodic pulses to control tube 11. Accordingly, relay 12 is again energized. This provides a system in which the proper indication is given regardless of the nature of the fault in the movement or operation being sensed.

Turning now to Figure 2, another embodiment of the invention is illustrated. As in Figure 1, the system is based on a sensing circuit 10 including an oscillator having pickup 10a connected therewith, in accordance with the teaching of the aforementioned copending application. The amplified oscillations derived from output terminal 10b of the amplifier-oscillator unit are coupled through a bias circuit, as will appear, to a control tube 30 which has a relay 31 connected in the anode circuit thereof. The circuit of Figure 2 is responsive to a shift from an oscillatory to a nonoscilatory condition of the sensing circuit to bring output tube 30 into conduction energizing relay 31 immediately, and the bias circuit keeps he tube conducting sufficiently to maintain the relay energized for a period after oscillation starts again.

An example of an application of this sensing system is in counting rapidly moving parts. For example, where parts are dropping down a chute, they move relatively rapidly. A pickup unit associated with the chute, as a coil having an open center through which the parts drop, is triggered for the short period of time, as a fraction of a millisecond, the part is in the field of the coil. Although the oscillator itself ceases operation during this period of time, the action is so rapid that a mechanical relay is unable to follow it in an ordinary circuit. As pointed out above, in the circuit of Figure 2, the shift of the sensing circuit from an oscillatory to a nonoscillatory condition (when the part passes the pickup coil) brings the output tube into conduction and the bias circuit maintains it in this condition for a period of time sufficient to actuate the relay in the indicator circuit even though the oscillator, in the meantime, has resumed oscillation. Relay 31 may, in turn, actuate a counter (not shown).

The output of oscillator-amplifier 10 is developed across amplifier load resistor 10c and is coupled through capacitor 33, 0.001 µf, to a rectifier diode 34, 1N34, having a load including capacitor 35, 100 µµf, in parallel with the resistor 36, 56,000 ohms, connected to ground 25. Resistor 37, 100,000 ohms, limits the current flow through diode 34. Connected across diode load resistor 36 is a diode 38, 1N459, shunted by resistor 40, with a load comprising capacitor 41, connected to ground and across which the control grid of control tube 30 is connected.

During oscillation, diode 34 acts as a half-wave rectifier, the current flowing through resistotr 36 with a negative potential appearing at the upper terminal thereof charging capacitor 41 by a circuit through resistor 40, shunted by the back resistance of diode 38. The resulting negative charge on capacitor 41 holds tube 30 cut off, or, at least, keeps the current below that required to maintain relay 31 energized. When a conductive article passes the pickup, oscillation ceases, and the charge on capacitor 41 drains off rapidly through diode 38 and resistor 36, reducing the potential on the control grid of control tube 30 to zero. The control tube then passes sufficient current to energize relay 31 providing the desired indication, as to a counter connected with contacts 31a. When the conductive article has passed the pickup and the oscillator resumes oscillation, the negative potential from the rectified oscillations appearing across resistor 36 tends to charge capacitor 41. However, the resistor 40 and capacitor 41 are of such size that this requires an appreciable period of time. For example, with resistor 40 having a value of ten megohms and capacitor 41 having a value of 0.25 µf, a delay of two to three seconds in the cutoff of tube 30 is possible, allowing the mechanical elements of the system to respond to the actuation of the sensing unit.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. An electrical sensing system, comprising: sensing means including an oscillator circuit having an oscillatory and a non-oscillatory condition; a bias circuit including rectifier means and a capacitor connected with said sensing means for developing a negative potential across said capacitor during the oscillatory condition of said oscillator circuit, said bias circuit having a negligible time constant with respect to the sensing period; an amplifier connected with said bias circuit and rendered cut off by said negative potential during the oscillatory condition of said oscillator and rendered conductive during the non-oscillatory condition of said oscillator, the anode voltage of said amplifier dropping upon the shift from oscillatory to non-oscillatory condition; and a second bias circuit connected with the anode of said amplifier and including rectifier means which charge a capacitor with a negative potential upon the drop in anode voltage; a resistance in parallel with said last mentioned capacitor for dissipating said negative potential; and a control tube connected with said last mentioned capacitor and rendered non-conductive by said negative potential and conductive in the absence thereof.

2. An electrical sensing system, comprising: sensing means including an oscillator circuit having an oscillatory and a non-oscillatory condition; a bias circuit connected to said oscillator including a rectifier with a parallel connected resistance-capacitance load, there being a negative potential established across said load during the oscillatory condition of said oscillator; a series circuit of resistance and capacitance connected across said load; a control tube connected across said second capacitor, and cut off in the presence of a negative potential thereacross; and a diode in shunt with said last mentioned resistor for discharging the control capacitor on cessation of oscillations.

3. An electrical sensing system, comprising: sensing means including an oscillator circuit having an oscillatory and a non-oscillatory condition; rectifier means with a capacitance load connected with said sensing means, there being a potential established across said capacitance during oscillations of said oscillator; bias means including a rectifier and a resistance-capacitance load connected with said first mentioned capacitance load; and a control tube connected across the capacitance element of said resistance-capacitance load of the bias means and controlled by the potential thereacross.

References Cited in the file of this patent

UNITED STATES PATENTS

| | | |
|---|---|---|
| 2,590,826 | Schenck | Mar. 25, 1952 |
| 2,806,181 | Rockafellow | Sept. 10, 1957 |
| 2,807,757 | Callinan | Sept. 24, 1957 |